(12) United States Patent
Gaudig et al.

(10) Patent No.: US 8,464,890 B2
(45) Date of Patent: Jun. 18, 2013

(54) STORAGE DEVICE FOR OBJECTS IN A MOTOR VEHICLE

(75) Inventors: Ralf Gaudig, Ruesselsheim (DE); Klaus Kuhlmann, Nauheim (DE); Werner Berhard, Nauheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 265 days.

(21) Appl. No.: 12/889,337

(22) Filed: Sep. 23, 2010

(65) Prior Publication Data

US 2011/0101722 A1     May 5, 2011

(30) Foreign Application Priority Data

Sep. 30, 2009 (DE) .......................... 10 2009 043 770

(51) Int. Cl.
*B60N 3/10* (2006.01)
(52) U.S. Cl.
USPC ............ 220/530; 220/531; 220/529; 220/737
(58) Field of Classification Search
CPC ....................................................... B60N 3/10
USPC ....... 220/531, 530, 529, 737, 738; 248/311.2
See application file for complete search history.

(56) References Cited

U.S. PATENT DOCUMENTS

| | | | | |
|---|---|---|---|---|
| 5,170,980 | A | * | 12/1992 | Burrows et al. ............ 248/311.2 |
| 5,975,342 | A | * | 11/1999 | Bradeen et al. ................ 220/737 |
| 7,213,793 | B2 | | 5/2007 | Sturt et al. |
| 7,521,911 | B2 | | 4/2009 | Endo |
| 7,997,635 | B2 | * | 8/2011 | Ercolano et al. ............. 296/37.1 |
| 2007/0018618 | A1 | | 1/2007 | Endo |
| 2008/0001423 | A1 | | 1/2008 | Ercolano et al. |
| 2010/0155441 | A1 | | 6/2010 | Gaudig et al. |

FOREIGN PATENT DOCUMENTS

| | | |
|---|---|---|
| DE | 10326883 A1 | 1/2005 |
| DE | 102006018859 A1 | 1/2007 |
| DE | 102006021685 A1 | 11/2007 |
| DE | 102008064459 A1 | 6/2010 |
| GB | 2425293 A | 10/2006 |
| GB | 2466356 A | 6/2010 |
| JP | 8216765 A | 8/1996 |
| JP | 10024770 A | 1/1998 |
| JP | 2001171416 A | 6/2001 |

OTHER PUBLICATIONS

German Patent Office, German Search Report for German Application No. 102009043770.3, dated Jan. 7, 2010.
British Patent Office, British Search Report for British Application No. 1017267.4, dated Jan. 17, 2011.

* cited by examiner

*Primary Examiner* — Stephen Castellano
(74) *Attorney, Agent, or Firm* — Ingrassia Fisher & Lorenz, P.C.

(57) ABSTRACT

A storage device is provided for objects in a motor vehicle, that includes, but is not limited to a side wall which laterally defines a receiving space for the objects, as well as an elongate, elastic band element, which is mounted in a hinged manner in the region of its ends facing away from each other in the side wall. The band element can be deformed from a first stable curved position into a second stable, oppositely curved position in which it projects into the receiving space. A band-shaped molding is mounted in the band element, which molding projects from the curved plane of the band element.

20 Claims, 3 Drawing Sheets

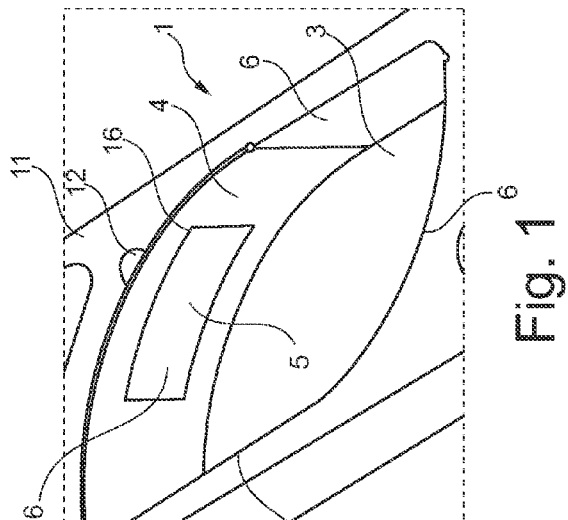
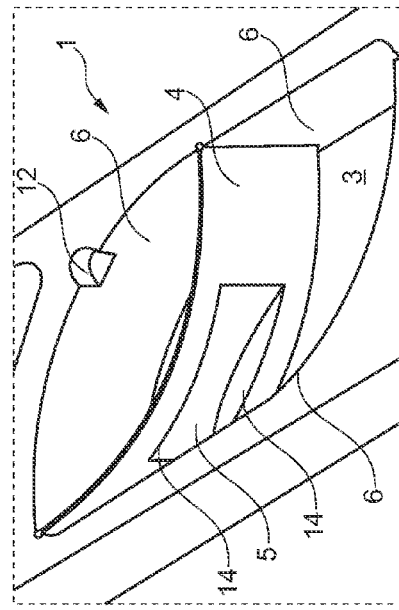
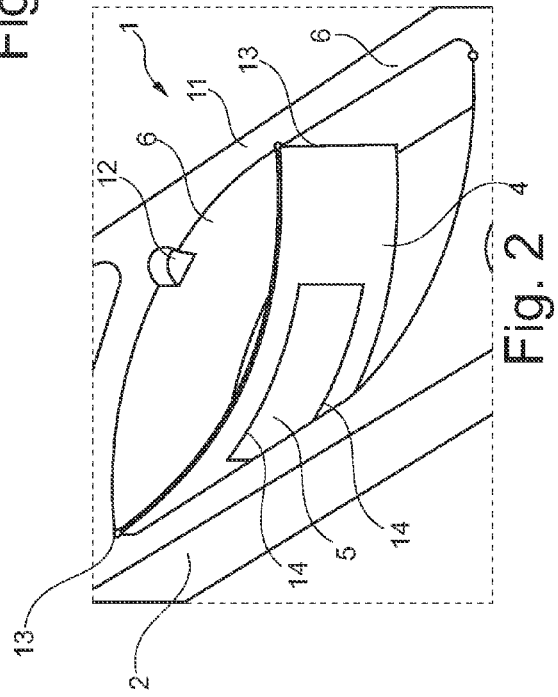

STORAGE DEVICE FOR OBJECTS IN A MOTOR VEHICLE

CROSS-REFERENCE TO RELATED APPLICATION

This application claims priority to German Patent Application No. 102009043770.3, filed Sep. 30, 2009, which is incorporated herein by reference in its entirety.

TECHNICAL FIELD

The technical field relates to a storage device for objects in a motor vehicle, comprising a side wall which laterally defines a receiving space for the objects, as well as an elongate, elastic band element, which is mounted in a hinged manner in the region of its ends facing away from each other in the side wall, wherein the band element can be deformed from a first stable curved position into a second stable, oppositely curved position in which it projects into the receiving space.

BACKGROUND

A storage device is described in the German Patent Application 10 2008 064 459.5. In this device, the receiving space can be divided by a plurality of, specifically two wall elements. In the respective first stable curved position of the wall elements, in which these abut against the side wall of the storage device, there is no divided receiving space for the objects. By transferring a band element or both band elements into the second stable, oppositely curved position, the receiving space can be divided into two or three partial spaces, whereby the receiving space is particularly suited for receiving smaller objects.

A disadvantage with this storage device is that the receiving space can always only be divided according to the two stable positions of the respective band element. In addition, in the case of the band element located in the second position, the curvature of one band element and therefore the contacting of the object placed in the receiving space is predefined in relation to the band element.

A similar configuration of a storage device is known from DE 10 2006 018 859 A1. Two elongate elastic band elements are provided there, each of which can be disposed in two different positions, wherein in each of the positions they can divide a receiving space formed by two side wall sections and a base of the storage device into three partial spaces. In one position of the two band elements arched away from one another, a large middle partial space and two smaller lateral partial spaces are formed for receiving a large container having a substantially circular cross-section. If the two band elements are arched toward one another, the central partial space is reduced and two larger outer partial spaces are obtained for receiving two smaller containers, in particular those having a circular cross-section.

It is known from US 2008/0001423 A1 to provide, in a storage device for objects in a motor vehicle, an elastic flat element, which can be moved from a first snap position into a second snap position. This flat element forms a pocket wall, and in one position of the pocket wall, a pocket for receiving objects is opened and in the other position it is closed.

It is at least one object to further develop a storage device of the said type such that a particularly advantageous, structurally simply configured, variable division of the receiving space is possible with a minimum number of components. In addition, other objects, desirable features, and characteristics will become apparent from the subsequent summary and detailed description, and the appended claims, taken in conjunction with the accompanying drawings and this background.

SUMMARY

A storage device of the type specified initially is provided where a band-shaped molding is mounted in the band element, which molding projects from the curved plane of the band element. This molding can be configured and mounted in the band element in such a manner that it projects from the curved plane of the band element both in the first and in the second position of the band element. This means that when the band element is located in the first position in which it abuts against the side wall, the molding projects from the curved plane of the band element and therefore extends into the receiving space. On the other hand, when the band element is located in the second position, the molding can project from the curved plane of the band element, and thus be directed in the direction of that section of the side wall against which the band element abuts in its first position. By this means, the partial region of the receiving space between band element and side wall is reduced by means of the molding, in relation to the section of the side wall in which the band element abuts in its first position, but with the advantage that an object inserted into the storage device in this region of the receiving space, which for example comprises a drinks can, abuts precisely against the molding and not against the band element curved according to the outer wall of the object.

By means of the band-shaped molding, a variable division of the receiving space is consequently possible with a structurally simple configuration of the storage device. The band-shaped molding is in particular mounted at a distance from the ends of the band element in said element.

According to a first embodiment of the invention, it is provided that the molding and the band element are one elastic part. According to a second embodiment, it is provided that the molding and the band element form separate parts and means are provided for connecting molding and band element.

When forming the molding and the band element as a single elastic part, the structurally simple configuration of this arrangement is of particular advantage. This configuration contributes appreciably to the fact that the storage device for objects can be manufactured cost-effectively.

When forming the molding and the band element as a single elastic part, it is considered to be particularly advantageous if, in the longitudinal extension of the band element, the band element has two slots, which are disposed parallel to one another and penetrate through the band element, and the molding is disposed between the slots, said molding being connected to the band element in a hinged manner in the area of its ends facing away from each another. In this configuration, the arrangement of molding and band element can be manufactured in a particularly simple manner since the band element is as it were provided with two parallel slots, the molding being produced by the two parallel slots.

In this one-part configuration, however the position of the molding is fixed in relation to the band element. If the molding is not pivoted from the curved plane of the band element, band element and molding form a curved plane. If the molding is pivoted from the curved plane of the band element, it acquires a shape having a curvature running opposite to the curvature of the band element.

If, on the other hand, molding and band element form separate parts, as a result of the means provided for connecting molding and band element, the molding can be placed largely arbitrarily in relation to the band element. This configuration of molding and band element and the means for fastening molding and band element can be implemented particularly simply if the means for connecting molding and band element are configured as hook and loop connectors, wherein the hook and loop connection of molding and band element is made in the area of the ends of the molding facing away from each other. In particular, at least on its side facing the molding, the band element is provided with hook and loop fastener elements, which in particular are disposed over the entire length of the band element. As a result, it is possible to position the molding in the area of the total length of the band element at any point of the band element. The molding can have any suitable shape which has the effect that it projects from the curved plane of the band element. The molding can be completely elastic.

An effect to be achieved with the molding, regardless of whether the molding forms one part with the band element or is a separate component, consists in that the molding can be transferred into a position, or adopts this position, in which it projects from the curved plane of the band element. In this case, it is irrelevant whether the band element is located in its first stable curved position or in its second stable curved position. On the other hand, and this can be implemented particularly simply if the molding and the band element form one part, the molding can be transferred into a position in which it does not project from the curved plane of the band element.

This is achieved in the one-part arrangement of molding and band element in a simple manner whereby the band element and the molding together snap over from the first position into the second position by acting on the arrangement, and conversely.

Constructively, the arrangement of band element and molding is in particular configured in such a manner that the length of the molding corresponds to approximately one third to two thirds of the length of the band element. In particular, the arrangement of band element and molding, in relation to their longitudinal extension and/or transverse extension, is configured to be symmetrical. In relation to their longitudinal extension and/or transverse extension, the molding is thus disposed centrally with respect to the band element.

In order to be able to move the band element from its first position into its second position, in the sense of a snap-over process, and hereby be able to grip the band element particularly easily, it is provided that in the region of the abutting band element, the side wall is provided with an open recess. The vehicle occupant can grip into this with one finger and hereby grasp the band element from behind to then move it into the second position.

The storage device preferably has two side wall sections, which are configured to be arched away from one another, a band element with molding being mounted in each side wall section. This arrangement makes it possible to form arched edge regions by means of the band elements and the arched side wall sections, whereby a plurality of arched regions of the storage device, which laterally delimit the receiving space, are created for receiving the objects.

The storage device can be configured as an accessory part, which is used for example in the area of a center console in the vehicle interior. In this case, it can be completely sufficient if the storage device is only formed by the side walls and one or more band elements with molding. On the other hand, particularly if the storage device forms an integral component of a console, in particular a center console of the vehicle, it is preferably provided that the receiving space is formed by the side wall and a base of the storage device.

BRIEF DESCRIPTION OF THE DRAWINGS

The present invention will hereinafter be described in conjunction with the following drawing figures, wherein like numerals denote like elements, and FIG. 1 to FIG. 3 show the visible band element in different positions and the molding mounted in the band element, likewise in different positions, for a first exemplary embodiment of the storage device;

DETAILED DESCRIPTION

The following detailed description is merely exemplary in nature and is not intended to limit application and uses. Furthermore, there is no intention to be bound by any theory presented in the preceding background or summary or the following detailed description.

Figure 8:
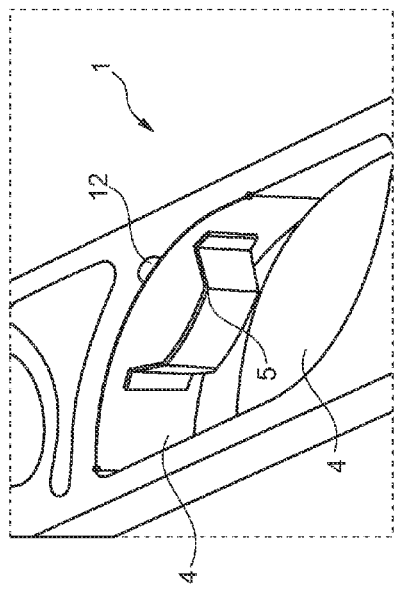
FIG. 8 to FIG. 11 show different arrangements of the band elements and a molding mounted in one of the band elements for a second exemplary embodiment in spatial representation and plan view.
Figure 9:
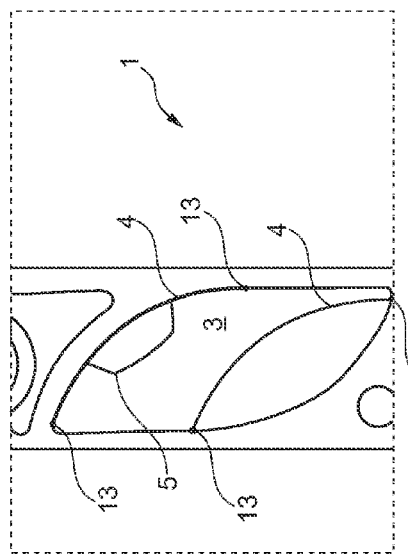
Figure 10:
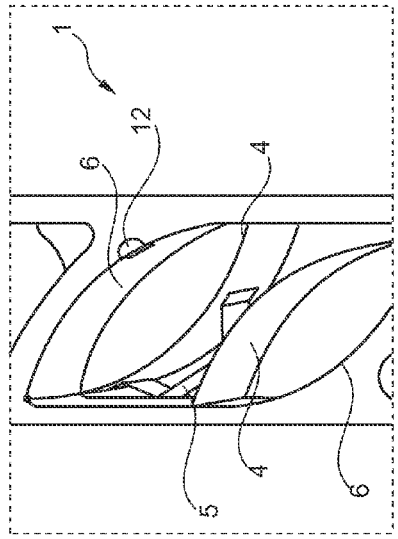
Figure 11:
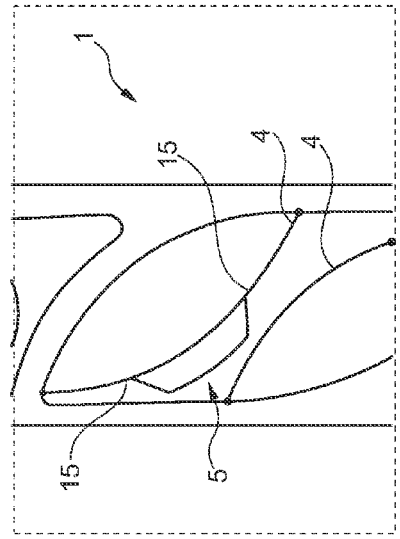

FIG. 1 to FIG. 7 illustrate the exemplary embodiment in which a band element and the molding associated with this form an elastic part. FIG. 8 to FIG. 10 illustrate an exemplary embodiment in which the band element and the molding associated with this form separate parts.

The storage device 1 according to the invention comprises a frame-like housing 2, in which a receiving space 3 is formed, furthermore two band elements 4 are mounted in the housing 2, wherein at least one molding 5 is mounted in one band element 4. The boundary of the housing 2 with respect to the receiving space 3 is formed by a peripheral, vertical side wall 6, which is formed by two identically configured side wall sections 7 and 8. The respective side wall section 7 or 8 has a straight-running region 9 and an adjoining curved region 10. In the area of its upper surface 11, the housing 2 in the curved region 10 of the side wall section 7 is provided with an upwardly open recess 12. This is optionally delimited at the bottom by a base of the storage device not shown.

The respective one of the two band elements 4 is configured to be elongate and elastic and in the area of its two narrow-side ends, is pivotally mounted by means of hinges 13 in the side wall 6. The mounting of the two band elements 4 is accomplished in the two acute-angled end regions of the side wall 6, at that point where the straight region 9 and the curved region 10 of the side wall section 7 or 8 meet one another. The other end of the respective band element 4 is mounted in the end wall section 7 or 8 at the point at which the respective straight region 9 goes over into the curved region 10.

Figure 4:
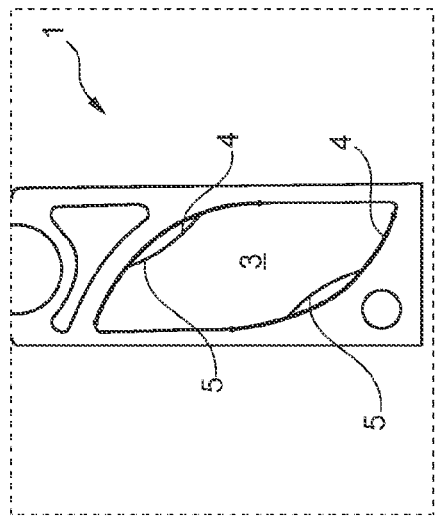
FIG. 4 to FIG. 7 show the storage device shown in FIG. 1 to FIG. 3 in a plan view, illustrated for different positions of the two band elements used here and the moldings mounted in the band elements.
Figure 6:
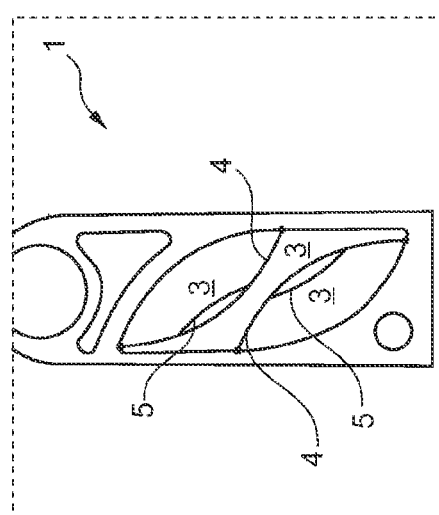

The respective band element 4 can be deformed from a first stable curved position, as illustrated in FIG. 1, FIG. 4 and FIG. 6, into a second stable opposite position, as illustrated in FIG. 2, FIG. 3, FIG. 5, and FIG. 7. In the exemplary embodiments illustrated, the respective band element 4 in its first stable curved position abuts against the side wall 6. However, this is not necessary particularly if it is important to divide the receiving space 3 into as many partial receiving spaces as possible. In the second stable oppositely curved position, the respective band element 4 projects into the receiving space 3.

Figure 7:
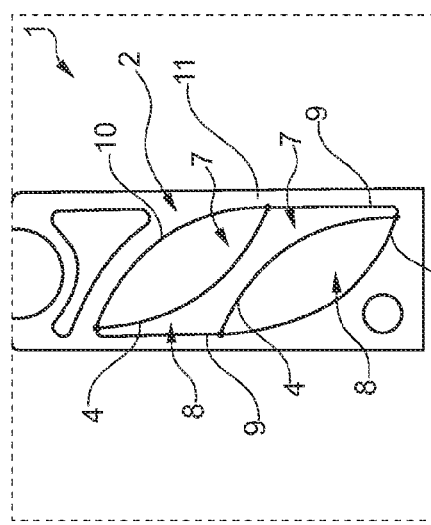

In the exemplary embodiment according to FIG. 1 to FIG. 7, the respective band element 4 and the molding 5 associated with this form a single elastic part. In this case, as can be deduced in particular from the diagram in FIG. 1 to FIG. 3, in its longitudinal extension, the band element 4 has two slots 14, which are disposed parallel to one another and penetrate the band element 4, whereby the molding is formed between the slots 14. In the region of its ends facing away from each other 16, this molding 5 is connected to the band element 4 in a hinged manner. The band element 4 and molding 5 can thus be made in the simplest manner from an elastic plate-shaped component of rectangular dimensions, in which two parallel slots are incorporated. Since both the band element 4 and the molding 5 are elastic in this exemplary embodiment, the molding 5 can occupy a curved position corresponding to the curvature of the band element 4, in relation to the two different positions of the band element. This means that the molding can be curved in accordance with the band element 4, as is depicted in FIG. 1, FIG. 2, FIG. 4, and FIG. 5, or the molding 5 is curved in the opposite direction to the band element 4, as is illustrated in FIG. 3, FIG. 6, and FIG. 7. By this means the receiving space 3 can be divided into different partial spaces. FIG. 1 shows the receiving space 3 not divided. FIG. 1 and FIG. 2 illustrate that by inserting a finger into the recess 12 and then pivoting the band element 4 away from the side wall 6, the band element 4 is deformed from the first position into the second position, the molding 5 following the curvature of the band element 4 as previously. It can be deduced from FIG. 3 that, starting from the situation in FIG. 2, the molding 5 is now pivoted by hand from the plane of curvature of the band element 4. By this means, an object inserted in the partial space between this band element 4 and the side wall sections 7 facing the recess 12, is particularly well positioned by means of the contour of the molding 5 which is arched in the direction of the object.

Figure 5:
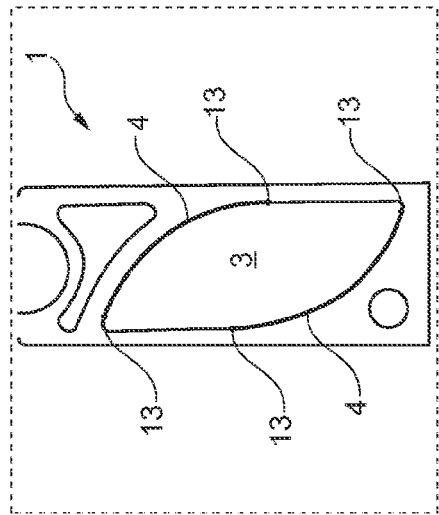

FIG. 4 illustrates the situation from FIG. 1 in plan view. FIG. 5 illustrates the situation in accordance with that of FIG. 2, with the difference that the second band element 4 is pivoted away from the side wall 6. In this case, the receiving space 3 is divided into three partial spaces. FIG. 6 illustrates a situation in accordance with that of FIG. 1 to FIG. 4. However, the respective molding 5 there is pivoted out from the curved plane of the associated band element 4. In this case, three partial spaces are again obtained, although two partial spaces are extremely small. FIG. 7 illustrates a situation in accordance with FIG. 5 with the difference that the moldings 5 are pivoted out from the plane of curvature of the band elements 4. In this case, five partial spaces are obtained, The moldings 5 directed toward the side wall 6 allow a particularly good positioning of objects, positioned between the molding 5 and the side wall 6.

The second exemplary embodiment according to FIG. 8 to FIG. 11 differs from that according to FIG. 1 to FIG. 7 in that at least in the case of one band element 4, this and the associated molding 5 form separate parts and means for connecting molding 5 and band element 4 are provided. The means for connecting molding 5 and band element 4 are formed, for example, by hook and loop connectors not illustrated in detail, the hook and loop connection of molding 5 and band element 4 being made in the area of the ends facing away from each other 15 of the molding 5. In a manner not illustrated in detail, the band element 4 is provided, at least on its side facing the molding 5, with hook and loop closure elements, which are disposed in particular over the entire length of the band element 4.

In all the illustrated embodiments, the molding 5 is disposed in relation to the band element 4 such that the arrangement of band element 4 and molding 5 is configured symmetrically in relation to their longitudinal extension and their transverse extension.

The storage device 1 described is used, for example, as an attachment part in a center console of motor vehicle, in particular a passenger automobile. However, it can also be provided with a base, whereby the housing 2 is closed at the bottom and this base can be used directly for receiving objects, in particular bottles, cans, and other object to be stored in the console.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A storage device for an object in a motor vehicle, comprising:
    a side wall that laterally defines a receiving space for the object;
    an elongate and elastic band element that is mounted in a hinged manner in a region of ends facing away from each other in the side wall, and
    a band-shaped elastic molding mounted in the elongate and elastic band element,
    wherein the elongate and elastic band element is deformed from a first stable curved position into a second stable and oppositely curved position in which the elongate and elastic band element is adapted to project into the receiving space,
    wherein the band-shaped molding is adapted to occupy a curved position corresponding to the first and second stable curved positions of the elongate and elastic band element and the band-shaped molding is adapted to transfer to project from a curved plane of the elongate and elastic band element.

2. The storage device according to claim 1, wherein in the first stable curved position, the elongate and elastic band element abuts against the side wall.

3. The storage device according to claim 1, wherein the band-shaped molding and the elongate and elastic band element are an elastic part.

4. The storage device according to claim 1, wherein the band-shaped molding and the elongate and elastic band element form separate parts and a means for connecting is provided for the band-shaped molding and the elongate and elastic band element.

5. The storage device according to claim 4, wherein the means for connecting the band-shaped molding and the elongate and elastic band element are configured as a hook and loop connector, wherein the hook and loop connectors of the band-shaped molding and the elongate and elastic band element is made in an area of ends facing away from each other of the band-shaped molding.

6. The storage device according to claim 4, wherein at least on a side facing the band-shaped molding, the elongate and elastic band element comprises a hook and loop fastener element that are disposed over an entire length of the elongate and elastic band element.

7. The storage device according to claim 5, wherein the band-shaped molding is elastic.

8. The storage device according to claim 1, wherein in the first stable curved position of the elongate and elastic band element, the band-shaped molding is curved away from the elongate and elastic band element into the receiving space.

9. The storage device according to claim 1, wherein a length of the band-shaped molding corresponds to approximately a range of about one-third to two-thirds of an element length of the elongate and elastic band element.

10. The storage device according to claim 1, wherein an arrangement of the elongate and elastic band element and the band-shaped molding in relation to an extension is configured to be substantially symmetrical.

11. The storage device according to claim 1, wherein in the region of the elongate and elastic band element, the side wall comprises an open recess.

12. The storage device according to claim 1, further comprising two side wall sections that are configured to be arched away from one another and the elongate and elastic band element with the band-shaped molding is mounted in at least one side wall section.

13. The storage device according to claim 1, wherein the receiving space is formed by the side wall and a base of the storage device.

14. A storage device for an object in a motor vehicle, comprising:
    a side wall that laterally defines a receiving space for the object; and
    an elongate and elastic band element that is mounted in a hinged manner in a region of ends facing away from each other in the side wall,
    wherein the elongate and elastic band element is deformed from a first stable curved position into a second stable and oppositely curved position in which the elongate and elastic band element is adapted to project into the receiving space,
    wherein a band-shaped molding is mounted in the elongate and elastic band element and the band-shaped molding is adapted to project from a curved plane of the elongate and elastic band element,
    wherein the band-shaped molding and the elongate and elastic band element are an elastic part, and
    wherein in a longitudinal extension, the elongate and elastic band element comprises two slots that are disposed substantially parallel to one another and substantially penetrate through the elongate and elastic band element, and the band-shaped molding is disposed between the two slots, the band-shaped molding connected to the elongate and elastic band element in the hinged manner in an area of ends facing away from each other.

15. The storage device according to claim 14, wherein the band-shaped molding is adapted to transfer into a position in which a molding curvature of the band-shaped molding corresponds to a curvature of the elongate and elastic band element.

16. The storage device according to claim 14, wherein in the first stable curved position, the elongate and elastic band element abuts against the side wall.

17. The storage device according to claim 14, wherein in the first stable curved position of the elongate and elastic band element, the band-shaped molding is curved away from the elongate and elastic band element into the receiving space.

18. The storage device according to claim 14, wherein a length of the band-shaped molding corresponds to approximately a range of about one-third to two-thirds of an element length of the elongate and elastic band element.

19. The storage device according to claim 14, wherein an arrangement of the elongate and elastic band element and the band-shaped molding in relation to an extension is configured to be substantially symmetrical.

20. The storage device according to claim 14, further comprising two side wall sections that are configured to be arched away from one another and the elongate and elastic band element with the band-shaped molding is mounted in at least one side wall section.

* * * * *